United States Patent
Yoon et al.

(10) Patent No.: US 9,407,957 B2
(45) Date of Patent: Aug. 2, 2016

(54) DISPLAY APPARATUS, EXTERNAL APPARATUS AND CONTROL METHODS THEREOF AND DISPLAY SYSTEM

(71) Applicant: SAMSUNG ELECTRONICS CO., LTD., Suwon-si (KR)

(72) Inventors: Yeo-ri Yoon, Cheongju-si (KR); Sang-hee Lee, Seoul (KR); Chang-soo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

(21) Appl. No.: 13/860,994

(22) Filed: Apr. 11, 2013

(65) Prior Publication Data

US 2013/0312022 A1    Nov. 21, 2013

(30) Foreign Application Priority Data

May 15, 2012    (KR) .................. 10-2012-0051297

(51) Int. Cl.
| | |
|---|---|
| H04N 7/16 | (2011.01) |
| H04N 7/10 | (2006.01) |
| H04N 5/445 | (2011.01) |
| H04N 7/173 | (2011.01) |
| H04N 21/442 | (2011.01) |
| H04N 21/258 | (2011.01) |
| H04N 21/44 | (2011.01) |

(52) U.S. Cl.
CPC ... *H04N 21/44204* (2013.01); *H04N 21/25891* (2013.01); *H04N 21/44016* (2013.01); *H04N 21/44222* (2013.01)

(58) Field of Classification Search
CPC .................. H04N 21/44204; G06F 17/30
USPC ....................... 725/14, 32, 39, 116
See application file for complete search history.

(56) References Cited

U.S. PATENT DOCUMENTS 6,041,311 A    3/2000  Chislenko et al.
7,904,924 B1   3/2011  De Heer et al.
(Continued)

FOREIGN PATENT DOCUMENTS

EP      2357744 A2    8/2011
WO  2007/102147 A2    9/2007

OTHER PUBLICATIONS

Communication dated Jul. 14, 2014, issued by the European Patent Office in counterpart European Application No. 13165316.4.

*Primary Examiner* — Pankaj Kumar
*Assistant Examiner* — Franklin Andramuno
(74) *Attorney, Agent, or Firm* — Sughrue Mion, PLLC

(57) ABSTRACT

Provided are a display system, an image processing apparatus, and an external apparatus, and methods of controlling the same. The display system includes: a plurality of servers which provides a video content; a display apparatus which interacts with the plurality of servers, and displays the video content provided by a first server of the plurality of servers; and an external apparatus which stores therein interaction history information of the display apparatus with the first server as a result of an interaction of the display apparatus with the first server, and transmits the stored interaction history information to a second server of the plurality of servers to enable the second server to provide the display apparatus with the video content based on the interaction history information when the display apparatus interacts with the second server.

20 Claims, 7 Drawing Sheets

(56) References Cited

U.S. PATENT DOCUMENTS

| | | | |
|---|---|---|---|
| 8,706,024 B2* | 4/2014 | Cugnini et al. | 455/3.01 |
| 2007/0199015 A1 | 8/2007 | Lopez et al. | |
| 2009/0094321 A1* | 4/2009 | Ueda et al. | 709/203 |
| 2010/0154035 A1 | 6/2010 | Damola et al. | |
| 2011/0173665 A1 | 7/2011 | Shim et al. | |
| 2012/0079529 A1* | 3/2012 | Harris et al. | 725/32 |
| 2012/0204201 A1* | 8/2012 | Cassidy et al. | 725/10 |
| 2013/0305334 A1* | 11/2013 | Videlov et al. | 726/7 |

\* cited by examiner

DISPLAY APPARATUS, EXTERNAL APPARATUS AND CONTROL METHODS THEREOF AND DISPLAY SYSTEM

CROSS-REFERENCE TO RELATED APPLICATION

This application claims priority from Korean Patent Application No. 10-2012-0051297, filed on May 15, 2012 in the Korean Intellectual Property Office, the disclosure of which is incorporated herein by reference in its entirety.

BACKGROUND

1. Field

Apparatuses and methods consistent with exemplary embodiments relate to a display apparatus, an external apparatus, control methods thereof, and a display system which plays and displays a video content supplied from the outside, and more particularly, to a display apparatus, an external apparatus, control methods thereof, and a display system which efficiently manages a usage history of various servers providing a video content.

2. Description of the Related Art

A display apparatus processes an image signal, which is input by an external image supply source in various manners, and displays an image on a display panel, e.g., including a liquid crystal display, based on the processed image signal. A display apparatus which is provided to general users is implemented as a TV or a monitor. For example, the display apparatus which is implemented as a TV may provide an image of a desired broadcasting channel by processing a broadcasting signal transmitted from the outside, through various processes such as tuning and decoding processes, or receive from a streaming server, and display, a digital video content.

Generally, more than one server provides a video content, and the display apparatus should be connected to each server providing various types of services to receive a desired service from the servers. The display apparatus logs into the server through its own account or ID and receives various services from the logged-in server. The server stores therein a usage history regarding the display apparatus, and provides the display apparatus with a service based on the stored history if the display apparatus is connected thereto through the same account in the future.

SUMMARY

According to an aspect of an exemplary embodiment, there is provided a display system including: a plurality of servers which provides a video content; a display apparatus which interacts with the plurality of servers, and displays the video content provided by at least one of the plurality of servers; and an external apparatus which stores therein interaction history information of the display apparatus with a first server of the plurality of servers as a result of an interaction of the display apparatus with the first server, and transmits the stored interaction history information to a second server of the plurality of servers to enable the second server to provide the display apparatus with the video content based on the interaction history information when the display apparatus interacts with the second server.

The display apparatus may store therein the interaction history information regarding the interaction with the first server, and may transmit the stored interaction history information to the external apparatus.

The display apparatus may transmit the stored interaction history information to the external apparatus in real-time or at a time when a connection to the first server is completed.

The interaction history information regarding the first server may include at least one of purchase information, viewing and downloading information regarding the video content, and user feedback information regarding the video content.

The external apparatus may be connected to the display apparatus locally or through a network for communication.

The external apparatus may be formed integrally in the display apparatus.

According to an aspect of another exemplary embodiment, there is provided a display apparatus including: a display; an image processor which processes a video content to display the video content on the display unit; a communicator which communicates with an external apparatus, and a plurality of servers providing the video content; and a controller which transmits interaction history information regarding a first server of the plurality of servers as a result of an interaction with the first server, to the external apparatus and controls the external apparatus to transmit the interaction history information to a second server of the plurality of servers to enable the second server to provide the video content based on the interaction history information when the interaction with the second server is performed.

The controller may transmit the interaction history information to the external apparatus in real-time or at a time when a connection to the first server is completed if the interaction with the first server is performed.

The interaction history information regarding the first server may include at least one of purchase information, viewing and downloading information regarding the video content, and user feedback information regarding the video content.

The communicator may be connected to the external apparatus locally or through a network for communication.

The display apparatus may be formed integrally in the external apparatus.

According to an aspect of another exemplary embodiment, there is provided a control method of a display apparatus, the control method including: interacting with a first server of a plurality of servers providing a video content; storing interaction history information as a result of the interaction with the first server; transmitting the interaction history information by the external apparatus to a second server of the plurality of servers to enable the second server to provide the video content based on the interaction history information if the interaction with the second server is performed, wherein the transmitting the interaction history information by the external apparatus to the second server includes transmitting interaction history information regarding the first server, to the external apparatus.

The transmitting the interaction history information regarding the first server to the external apparatus may include transmitting the information in real-time or at a time when a connection to the first server is completed if the interaction with the first server is performed.

The interaction history information regarding the first server may include at least one of purchase information, viewing and downloading information regarding the video content, and user feedback information regarding the video content.

According to an aspect of another exemplary embodiment, there is provided an external apparatus of a display apparatus including: a communicator which communicates with a display apparatus, and a plurality of servers providing a video content to the display apparatus; a controller which transmits interaction history information of the display apparatus regarding a first server of the plurality of servers to a second server to enable the second server to provide the video content to the display apparatus based on the interaction history information when the display apparatus interacts with the second server, upon receiving the interaction history information as a result of an interaction of the display apparatus with the first server.

The controller may receive the interaction history information in real-time or at a time when a connection of the display apparatus to the first server is completed, as a result of the interaction of the display apparatus with the first server.

The interaction history information regarding the first server may include at least one of purchase information, viewing and downloading information regarding the video content, and user feedback information regarding the video content.

The communicator may be connected to the display apparatus locally or through a network for communication.

The external apparatus may be formed integrally in the display apparatus.

According to an aspect of another exemplary embodiment, there is provided a control method of an external apparatus of a display apparatus, the control method including: connecting to a display apparatus and a plurality of servers providing the display apparatus with a video content, for communication; receiving interaction history information of the display apparatus regarding a first server of the plurality of servers as a result of an interaction by the display apparatus with the first server; and transmitting the received interaction history information to a second server of the plurality of server to enable the second server to provide the video content to the display apparatus based on the interaction history information if the display apparatus interacts with the second server.

The receiving the interaction history information of the display apparatus may include receiving the interaction history information in real-time or at a time when a connection of the display apparatus to the first server is completed, as a result of the interaction by the display apparatus with the first server.

The interaction history information regarding the first server may include at least one of purchase information, viewing and downloading information regarding the video content, and user feedback information regarding the video content.

According to an aspect of another exemplary embodiment, there is provided a control method of an image processing apparatus, the control method including: interacting with a first server, of a plurality of servers providing a video content; transmitting, to an external apparatus, interaction history information regarding the first server, the interaction history information resulting from the interacting with the first server; and receiving, from a second server of the plurality of servers, the video content according to the interaction history information transmitted to the external apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
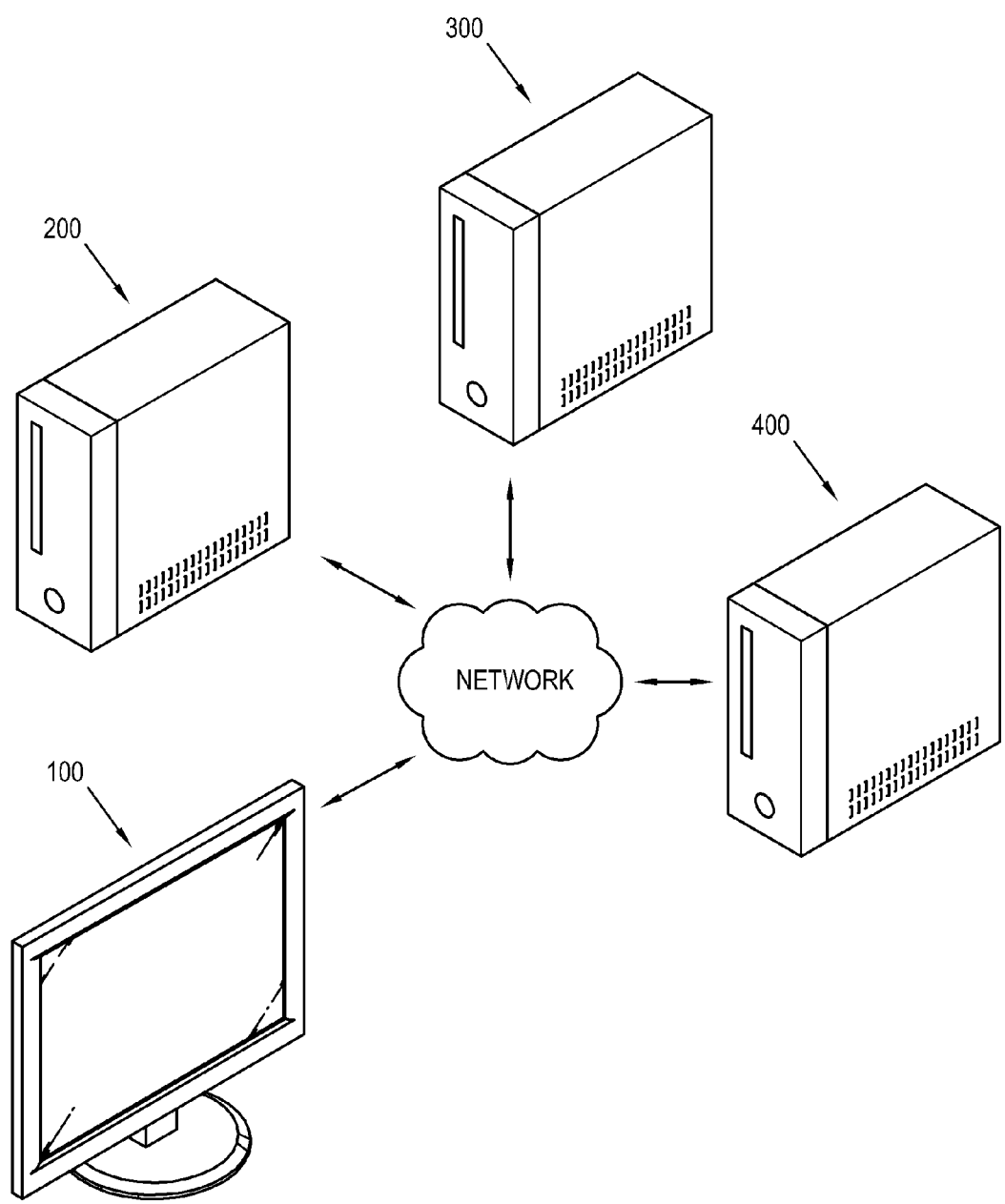
FIG. 1 illustrates an example of a display system according to an exemplary embodiment.

Below, exemplary embodiments will be described in detail with reference to accompanying drawings so as to be easily realized by a person having ordinary knowledge in the art. Exemplary embodiments may be embodied in various forms without being limited to the exemplary embodiments set forth herein. Descriptions of well-known parts are omitted for clarity, and like reference numerals refer to like elements throughout.

FIG. 1 illustrates an example of a display system according to an exemplary embodiment.

As shown therein, the display system is formed by connecting a plurality of apparatuses 100, 200, 300, and 400 through a wired/wireless network for communication thereamong. The plurality of apparatuses 100, 200, 300, and 400 of the display system includes a display apparatus 100, and servers 200, 300, and 400 which are connected to the display apparatus 100 through a network.

In FIG. 1, a single display apparatus 100 is connected to the three servers 200, 300, and 400, although it is understood that one or more other exemplary embodiments are not limited thereto. That is, in one or more other exemplary embodiments, the number of display apparatuses 100 and the number of servers 200, 300, and 400 which are connected to the network may vary.

The display apparatus 100 is connected to the servers 200, 300, and 400 and receives various types of data/information therefrom. The data/information may include, e.g., image data and voice data of various contents and various additional data such as guidance and explanation on the content, although it is understood that the data/information is not limited thereto.

The display apparatus 100 according to the present exemplary embodiment is implemented as a TV which processes a broadcasting signal provided by transmission equipment (not shown) of a broadcasting station, and displays a broadcasting image based on the processed broadcasting signal. However, it is understood that one or more other exemplary embodiments are not limited to the display apparatus 100 implemented as a TV, and may be implemented as other various types of apparatuses which display an image based on image signals/image data transmitted from the outside and communicate with the servers 200, 300, and 400. Examples of such other various types of apparatuses include a portable multimedia player (PDP), a mobile phone, a computer, a notebook computer, a tablet device, a mobile device, a gaming system, etc. Furthermore, it is understood that one or more other exemplary embodiments may implement an image processing device (such as a set-top box, an optical media reproducing device, etc.) which processes an image and outputs the image to be displayed by an external display device.

The display apparatus 100 may receive video content data transmitted from the outside, and process and play the received video content data to display an image. In the display system, the servers 200 and 300 supply video content data in a digital format to the display apparatus 100 at the request of the display apparatus 100 through video-on-demand (VOD). The servers 200 and 300 which supply the video content data as above will be referred to as content servers 200 and 300.

The content servers 200 and 300 may supply video content data to the display apparatus 100 through a network without limitation at the request of the display apparatus 100. Alternatively, the content servers 200 and 300 may authorize the request of the video content from the display apparatus 100, and determine whether to supply the video content according to the authorization result. The present exemplary embodiment relates to the latter case, which will be described hereinafter.

The display apparatus 100 logs in to the content servers 200 and 300 through ID information which is provided for each of the content servers 200 and 300. Upon request for the log-in from the display apparatus 100, the content servers 200 and 300 perform an authorization process for the ID information transmitted by the display apparatus 100, and allow the connection of the display apparatus 100 thereto according to the authorization process.

The content servers 200 and 300 may provide various types of services to the display apparatus 100 and provide customized services to the display apparatus 100 for each ID information based on connection or usage history of the display apparatus 100 regarding the content servers 200 and 300 when the display apparatus 100 is logged therein. For example, upon receiving a request for a video content from the display apparatus 100 which is logged in to the content servers 200 and 300, the content servers 200 and 300 may provide the display apparatus 100 with relevant information depending on whether the display apparatus 100 has purchased or downloaded the video content.

If there is a plurality of content servers 200 and 300, the display apparatus 100 uses ID information for each of the content servers 200 and 300 to thereby be connected to the content servers 200 and 300, respectively. However, it is not easy for a user of the display apparatus 100 to memorize all ID information of the content servers 200 and 300.

Accordingly, the display system includes an external apparatus 400 which manages an account of the display apparatus 100 integrating each of plural ID information for the display apparatus 100 to be connected to the plurality of content servers 200 and 300.

The external apparatus 400 according to the present exemplary embodiment is expressed as a server connected to the display apparatus 100 through a network, although it is understood that the external apparatus 400 may be connected to the display apparatus 100 locally. However, the external apparatus 400 may communicate with the content servers 200 and 300 as well as with the display apparatus 100.

The account is inherent information specifying a profile of a user using the display apparatus 100, including a user's personal information, environment information of the display apparatus 100 set by the user, a user's various usage history and interaction information regarding the display apparatus 100, etc.

The interaction information relates to various interactions performed between at least two apparatuses, e.g., the display apparatus 100 and a first content server 200. The interaction performed between the two apparatuses such as the display apparatus 100 and the first content server 200 includes exchange or sharing of data/information/signals therebetween, in which case the interaction information includes data/information exchanging history between the display apparatus 100 and the first content server 200.

Otherwise, based on the display apparatus 100, the interaction may include usage of services by the display apparatus 100 regarding the services provided by the content server 200. In this case, the interaction information includes a usage history of the services provided by the content server 200 for the display apparatus 100.

If a user of the display apparatus 100 is logged in to the first content server 200 through a predetermined account, the interaction information may be classified by account. A single display apparatus 100 may have a plurality of accounts, and a user may select one of the plurality of accounts of the display apparatus 100 and may be logged in to the first content server 200 through the selected account. Accordingly, even if a single display apparatus 100 is connected to the first content server 200, the interaction information is classified by the account of the display apparatus 100 used for the connection.

For example, the case where a user of the display apparatus 100 is connected, through a predetermined account, to the first content server 200 providing a content sale service will be considered. After authorization of the account, a user may search the content provided by the first content server 200, purchase and download the searched content, play and view the downloaded content and transmit his/her comment on the viewed content to the first content server 200.

Such a series of interactions include exchange of various data/information/signals between the display apparatus 100 and the first content server 200 by a user's manipulation, and interaction information includes interaction history. The interaction and the interaction information which are explained above are one of various implementations, which may be varied and amended to realize the spirit of the present inventive concept. The foregoing example does not limit the meaning of terms.

The present exemplary embodiment explains the case where the display apparatus 100 has a single account. However, the display apparatus 100 may have a plurality of accounts, in which case one of the accounts may be selected by a user or set as a default.

Otherwise, account information may be stored in the external apparatus 400 rather than in the display apparatus 100. Then, the display apparatus 100 may select one of the accounts stored in the external apparatus 400 after being connected to the external apparatus 400. In the course of selecting the account stored in the external apparatus 400, an additional authorization process may be performed.

Prior to the log-in to the content servers 200 and 300, the display apparatus 100 may be connected to the external apparatus 400 through its own account. The display apparatus 100 may request the authorization of the account to the external apparatus 400, and if the external apparatus 400 authorizes the account, the display apparatus 100 may be logged in to the content servers 200 and 300 through the account.

Figure 2:
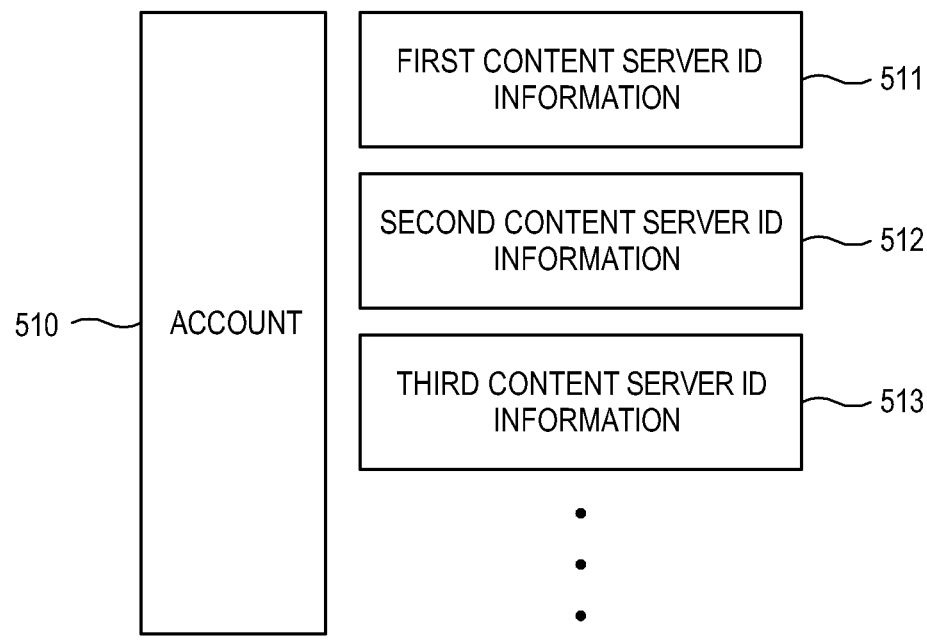
FIG. 2 illustrates an example of ID information which is managed by a single account in the display system in FIG. 1.

FIG. 2 illustrates an example of ID information managed by a single account 510.

As shown therein, in order for the display apparatus 100 to be logged in to the plurality of content servers 200 and 300, the display apparatus 100 should request the log-in to the content servers 200 and 300 by using ID information set for each of the content servers 200 and 300. The ID information may include inherent information such as ID and passwords which are expressed in a combination of letters and numbers.

The external apparatus 400 stores therein ID information 511, 512 and 513 as subordinate or meta information of the account 510 of the display apparatus 100 which is used for the display apparatus 100 to be logged in to the content servers 200 and 300. That is, the single account 510 has the ID information 511, 512 and 513 used by the display apparatus 100 to log in to the content servers 200 and 300, as meta information.

If the authorization of the display apparatus 100 is performed through the predetermined account 510, the external apparatus 400 provides the display apparatus 100 with the stored ID information 511, 512, and 513 of the content servers 200 and 300 corresponding to the account 510. The display apparatus 100 receives the ID information 511, 512, and 513 corresponding to the authorized account 510 from the external apparatus 400, and is logged in to the content servers 200 and 300 through the ID information 511, 512 and 513.

As the ID information 511, 512, and 513 of the content servers 200 and 300 are integrated and managed in the single account 510, a user of the display apparatus 100 may easily log in to the content servers 200 and 300 and use services of the content servers 200 and 300.

To perform the foregoing, the external apparatus 400 may include a communication unit which communicates with the content servers 200 and 300 and the display apparatus 100, and a controller which performs the foregoing operation.

Figure 3:
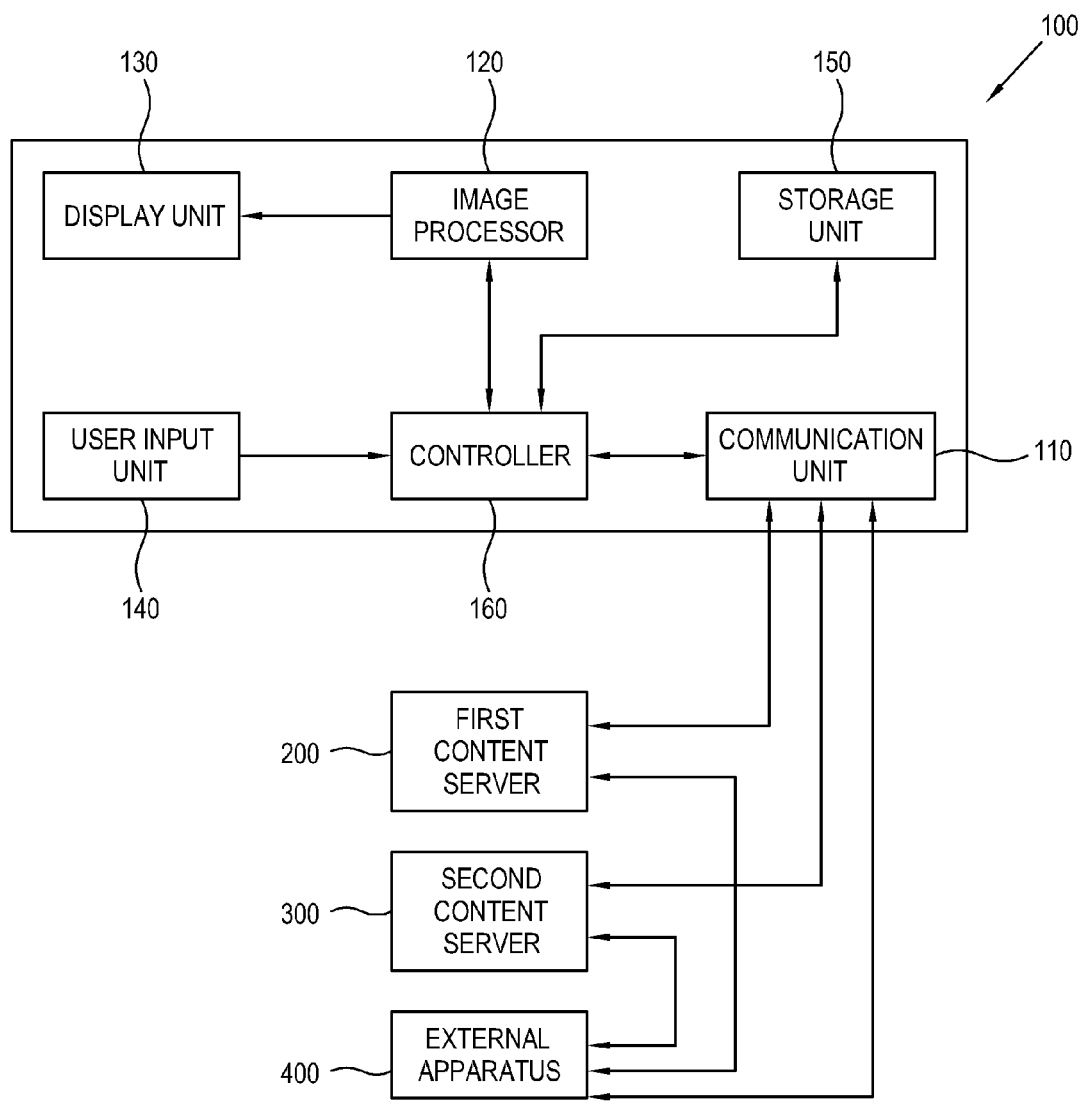
FIG. 3 is a block diagram of a display apparatus in the display system in FIG. 1.

Hereinafter, a detailed configuration of the display apparatus 100 will be described with reference to FIG. 3. FIG. 3 is a block diagram of the display apparatus 100.

As shown therein, the display apparatus 100 includes a communication unit 110 which communicates with the apparatuses 200, 300, and 400, and exchanges unlimited data/signals/information with the apparatuses 200, 300, and 400, an image processor 120 which processes image data transmitted through the communication unit 110, through preset processes, a display unit 130 which displays an image thereon based on the image data processed by the image processor 120, a user input unit 140 which outputs a preset command/information by a user's manipulation, a storage unit 150 which stores therein unlimited data/information of the display apparatus 100, and a controller 160 which controls various operations of the display apparatus 100.

The communication unit 110 (e.g., communicator) is connected to an external network according to a preset wired/wireless communication protocol, and enables the first display apparatus 100 to communicate with the apparatuses 200, 300 and 400 which are connected to the same network. Examples of the communication unit 110 include a network card, a wireless transceiver, a data port, etc. The communication unit 110 performs an interactive communication so that the controller 160 exchanges predetermined data with the apparatuses 200, 300, and 400. That is, the communication unit 110 transmits data from the display apparatus 100 to the apparatuses 200, 300, and 400, or transmits data from the apparatuses 200, 300, and 400 to the controller 160 according to a control of the controller 160.

The communication unit 110 may receive image data of a video content from the content servers 200 and 300, although it is understood that one or more other exemplary embodiments are not limited thereto. The present exemplary embodiment explains the case where the communication unit 110 receives image data, but the element of the display apparatus 100 receiving image data/image signals/image information is not limited to the communication unit 110. For example, the display apparatus 100 may further include an additional image receiver (not shown) to receive radio frequency (RF) signals transmitted by a broadcasting station (not shown), and various signals though a scheme such as composite/component video, super video, SCART, high definition multimedia interface (HDMI), DisplayPort, unified display interface (UDI) or wireless HD standards, or may have the communication unit 110 receive the foregoing image signal.

The image processor 120 processes image data received by the communication unit 110 according to various image processing operations. The image processor 120 outputs the processed image data to the display unit 130, on which an image is displayed on the basis of the image data.

The image processing operation performed by the image processor 120 includes, e.g., but not limited to, a decoding operation corresponding to an image format of an image signal, a de-interlacing operation for converting interlace image data into progressive image data, a scaling operation for adjusting an image signal into a preset resolution, a noise reduction operation for improving an image quality, a detail enhancement operation, a frame refresh rate conversion operation, etc.

The image processor 120 may be implemented as a system-on-chip (SOC) integrating the foregoing functions or as an image processing board (not shown) which is formed by mounting individual elements performing the foregoing operations independently on a printed circuit board (PCB) (not shown), and is built in the display apparatus 100.

The display unit 130 (e.g., display) displays an image thereon based on image data which are output by the image processor 120. The display unit 130 may include liquid crystal, plasma, light-emitting diode, organic light-emitting diode, surface-conduction electron-emitter, carbon nano-tube, and nano-crystal, although not limited thereto.

The display unit 130 may further include elements depending on its implementation type. For example, if the display unit 130 includes liquid crystal, the display unit 130 includes a liquid crystal display (LCD) panel, a backlight unit to emit light to the LCD panel, and a panel driving substrate to drive the LCD panel.

The user input unit 140 (e.g., user inputter) transmits preset various control commands or unlimited information to the controller 160 by a user's manipulation and input. The user input unit 140 may be implemented as a menu key and an input panel provided on an external surface of the display apparatus 100, or a remote controller which is separated from the display apparatus 100. Furthermore, the user input unit 140 may be integrally formed in the display unit 130. For example, if the display unit 130 includes a touch screen, a user may transmit a preset command to the controller 160 through the input menu displayed on the display unit 130.

The storage unit 150 (e.g., storage) stores therein unlimited data according to a control of the controller 160. The storage unit 150 may be implemented as a non-volatile memory such as a flash memory or a hard disc drive so as not to lose the data stored therein even if the display apparatus 100 is turned off. The storage unit 150 is accessed by the controller 160, which reads/records/modifies/deletes/updates the data.

The controller 160 controls various operations performed within the display apparatus 100. For example, the controller 160 logs in to the content servers 200 and 300 through the account of the display apparatus 100. While logged in to the servers 200 and 300 through the account, the controller 160 may request a predetermined video content from the content servers 200 and 300. If the content servers 200 and 300 provide video content data, the controller 160 transmits the video content data to the image processor 120 to display an image on the display unit 130.

The control operation of the controller 160 may be performed by a user's manipulation of the user input unit 140.

As the content servers 200 and 300 independently provide a content to the display apparatus 100, the first content server 200 does not take into account whether the service provided by the first content server 200 is the same as that provided by a second content server 300. Thus, the service of the first content server 200 and the service of the second content server 300 may be repetitive.

For example, if the display apparatus 100 has purchased a predetermined content from the first content server 200, the purchase history is stored in the first content server 200. If the display apparatus 100 is logged in to the first content server 200 later, the first content server 200 may provide information that the content has already been purchased by the display apparatus, according to the stored history information.

However, the content has been purchased in the first content server 200 rather than the second content server 300 and thus the second content server 300 does not store the history information therein. Accordingly, if the display apparatus 100 searches the same content in the second content server 300, the second content server 300 does not provide the display apparatus 100 with the information that the first content has already been purchased in the first content server 200.

As a result, a user of the display apparatus 100 may purchase the same content from the second content server 300 that has already been purchased from the first content server 200. To prevent such a problem, the following method is provided according to the present exemplary embodiment.

The display apparatus 100 stores therein the interaction history information which is generated as a result of its interaction with the first content server 200, and transmits the interaction history information to the external apparatus 400. The external apparatus 400 transmits the received interaction history information to the second content server 300.

The second content server 300 stores therein the transmitted interaction history information, and provides the display apparatus 100 with a video content based on the stored interaction history information when the display apparatus 100 is connected thereto and performs an interaction therewith. Then, a user may be provided the service from the second content server 300 based on the interaction history information of the first content server 200, and repetitive services of the content servers 200 and 300 may be prevented.

Hereinafter, the present exemplary embodiment will be described in more detail. The display apparatus 100 receives ID information from the external apparatus 400 to be logged in to the content servers 200 and 300 through its own account, and is logged in to the content servers 200 and 300 through the ID information. The display apparatus 100 stores therein the interaction history information of the first content server 200 while interacting with the first content server 200 and transmits the stored interaction history information to the external apparatus 400.

The external apparatus 400 transmits the interaction history information from the display apparatus 100 to the second content server 300. The second content server 300 stores therein the interaction history information transmitted by the external apparatus 400, corresponding to the display apparatus 100.

If the display apparatus 100 is connected to, and interacts with, the second content server 300 later, the second content server 300 provides the display apparatus 100 a service such as provision of video content data, based on the stored interaction history information. The interaction history information includes a history of the previous interaction performed by the display apparatus 100 with the first content server 200, and the display apparatus 100 may receive a service from the second content server 300 based on the interaction history regarding the first content server 200.

The present exemplary embodiment is explained with reference to only two content servers 200 and 300, although it is understood that one or more other exemplary embodiments may apply to three or more content servers 200 and 300. That is, interaction history information of one of the content servers 200 and 300 may be transmitted by the external apparatus 400 to the remaining content servers 200 and 300 to share interaction history information among the content servers 200 and 300.

The interaction with the first content server 200 collectively refers to exchange of data/information/signals between the display apparatus 100 and the first content server 200, and the operation of the display apparatus 100 using the first content server 200. For example, the interaction with the first content server 200 may include feedback information of a user regarding contents such as purchase, viewing, and downloading of the content by the display apparatus 100 through the account or preferences or opinions on the content.

In the present exemplary embodiment, the external apparatus 400 is provided separately from the display apparatus 100, and transmits the interaction history information to the second content server 300. However, it is understood that one or more other exemplary embodiments are not limited to the foregoing. For example, the external apparatus 400 and the display apparatus 100 may be integrated as a single apparatus, which stores therein the interaction history information and transmits the stored interaction history information to the content servers 200 and 300.

Figure 4:
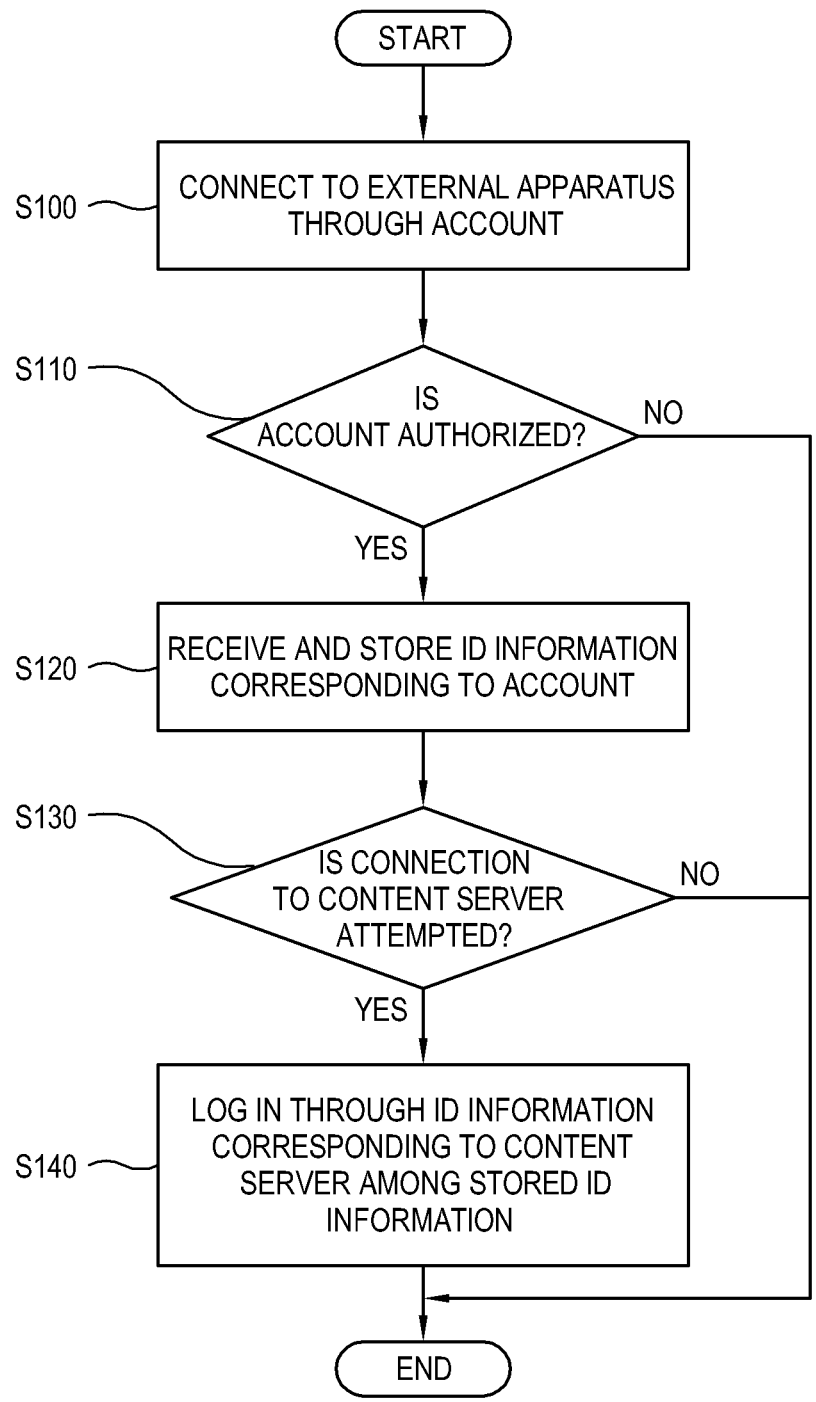
FIG. 4 is a control flowchart showing a connection process of the display apparatus to a content server in the display system in FIG. 1.

Hereinafter, a method of connecting the display apparatus 100 to the content servers 200 and 300 will be described with reference to FIG. 4. FIG. 4 is a control flowchart of the connection process according to an exemplary embodiment.

As shown therein, the display apparatus 100 is connected to the external apparatus 400 through a preset account (operation S100). If the display apparatus 100 has a plurality of accounts, one of the accounts may be selected by a user or set as a default and selected automatically. If the accounts are stored in the external apparatus 400 rather than in the display apparatus 100, the display apparatus 100 may be connected to the external apparatus 400 and select one of the accounts.

If the external apparatus 400 authorizes the account (operation S110), the display apparatus 100 receives from the external apparatus 400 and stores therein each ID information corresponding to the account. The ID information includes login information regarding the content servers 200 and 300.

The display apparatus 100 attempts to log in to the content servers 200 and 300 (operation S130). The display apparatus 100 selects ID information corresponding to the content servers 200 and 300 among the ID information transmitted by the external apparatus 400 and stored in the display apparatus 100, and is logged in to the content servers 200 and 300 through the ID information (operation S140).

Figure 5:
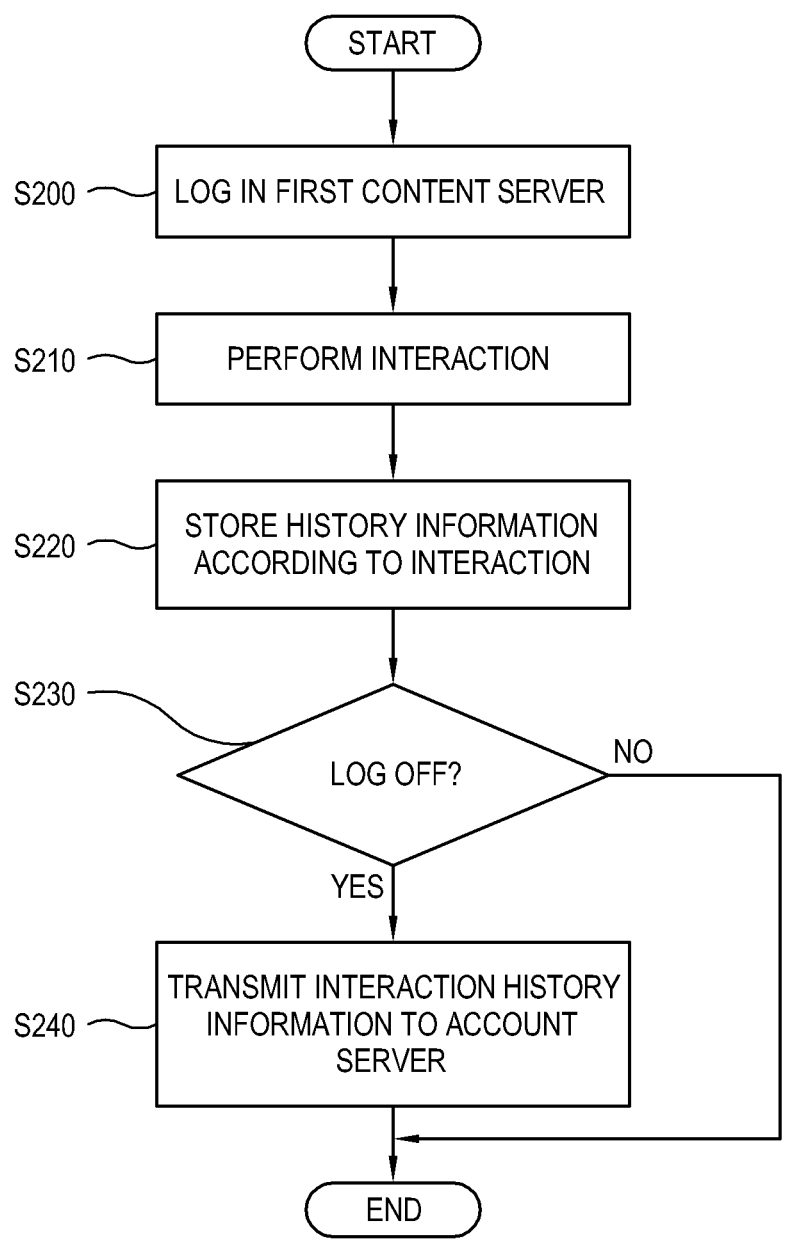
FIG. 5 is a control flowchart showing an interaction process of the display apparatus with a first content server in the display system in FIG. 1.

Hereinafter, an interaction process of the display apparatus 100 with the first content server 200 will be described with reference to FIG. 5. FIG. 5 is a control flowchart showing the interaction process.

As shown therein, the display apparatus 100 is logged in to the first content server 200 (operation S200). As explained above with reference to FIG. 4, the log-in process is performed through the ID information which has been transmitted by the external apparatus 400 corresponding to the account.

The display apparatus 100 interacts with the first content server 200 while being logged in to the first content server 200 (operation S210). The display apparatus 100 stores therein the interaction history information while or as a result of the interacting (operation S220). The first content server 200 also stores therein the interaction history information regarding the display apparatus 100, and may provide the display apparatus 100 a service based on the stored interaction history information.

If the display apparatus 100 is disconnected from and logged off of the first content server 200 (operation S230), the display apparatus 100 transmits the interaction history information regarding the first content server 200, which has been stored at operation S220, to the external apparatus 400 (operation S240).

In the present exemplary embodiment, the timing at which the display apparatus 100 transmits the interaction history information to the external apparatus 400 is the timing at which the display apparatus 100 is logged off from the first content server 200. However, the transmission timing may vary, e.g., may occur in real-time, a user-set time, at predetermined intervals, etc., at operation S220.

Figure 6:
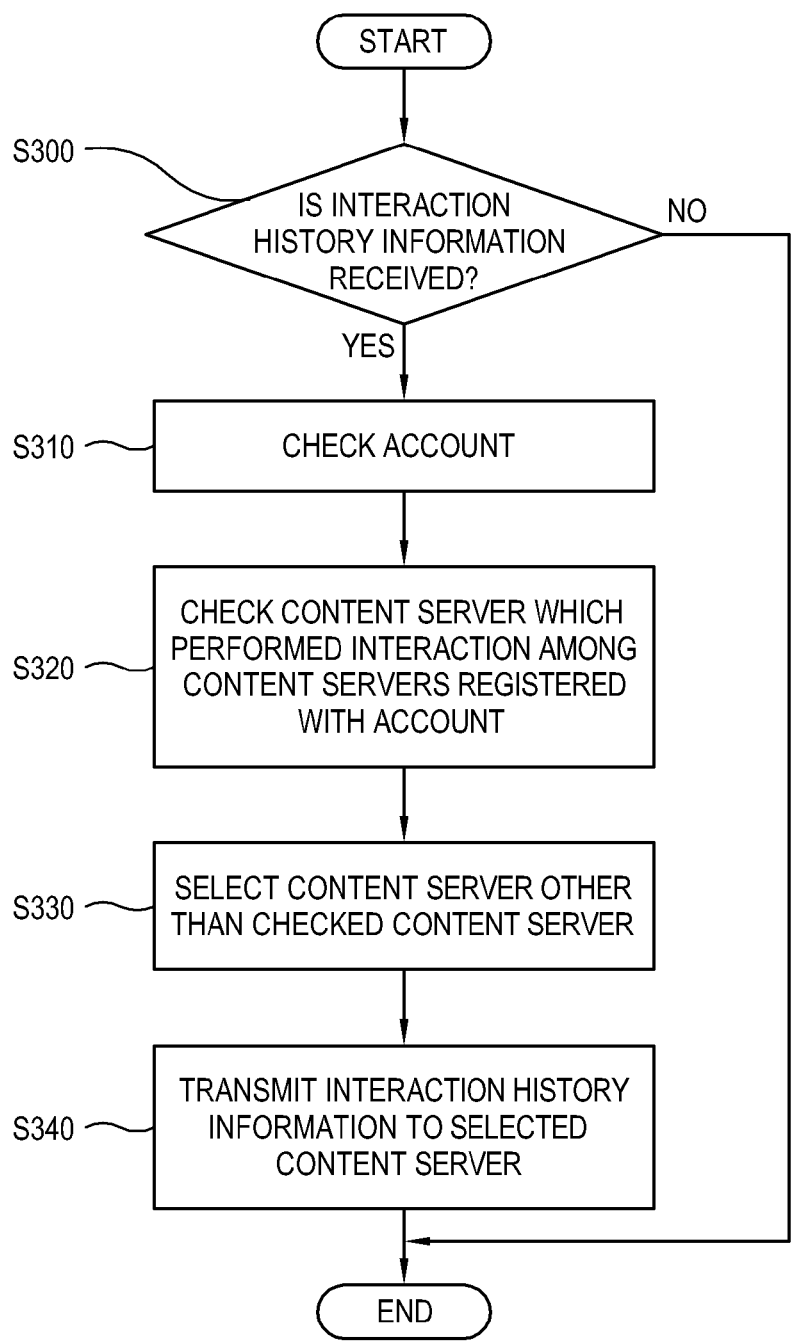
FIG. 6 is a control flowchart showing a feedback of interaction history information of an external apparatus in the display system in FIG. 1.

Hereinafter, a method of transmitting the interaction history information by the external apparatus 400 will be described with reference to FIG. 6. FIG. 6 is a control flowchart showing the transmission process.

As shown therein, the external apparatus 400 receives the interaction history information from the display apparatus 100 (operation S300), and checks the account through which the information has been received (operation S310).

Among the plurality of content servers 200 and 300 corresponding to the ID information registered with the checked account, the external apparatus 400 checks (e.g., determines) the content server 200 which relates to the interaction history information transmitted at operation S300, i.e., the content server which has performed the interaction based on which the interaction history information is generated (operation S320). As an example, the received interaction history information may include or may have corresponding information specifying the content server 200 which relates to the interaction history information.

Among the plurality of content servers 200 and 300, the external apparatus 400 selects the content server 300 other than the content server 200 checked at operation S320 (operation S330). The content server 200 which has been checked at operation S320 has performed the interaction and the interaction history information is, therefore, not required to be transmitted to the content server 200 in the present exemplary embodiment. However, it is understood that another exemplary embodiment is not limited thereto. For example, according to another exemplary embodiment, the content server 200 which interacts with the display apparatus 100, based on which the interaction history information is generated, may receive the interaction history information from the external apparatus 400 and may store the received interaction history information. In this case, the interaction history information may not be previously stored by the content server 200 or may be previously stored by the content server 200 such that the received interaction history information overwrites the previously stored interaction history information, is added to the previously stored interaction history information, is additionally stored, or is discarded.

The external apparatus 400 transmits the interaction history information to the content server 300 selected at operation S330 (operation S340). The external apparatus 400 transmits information specifying the display apparatus 100 which performed the interaction resulting in the interaction history information, together with the interaction history information, to the content server 300. Such information may include account information of the display apparatus 100, and the content server 300 may determine that the interaction history information from the external apparatus 400 corresponds to the display apparatus 100. Furthermore, the external apparatus 400 may transmit information specifying the content server 200 which relates to the interaction history information.

The content server 300 which receives the interaction history information may provide the display apparatus 100 with a service based on the interaction history information if the display apparatus 100 is logged therein through the account corresponding to such information.

Figure 7:
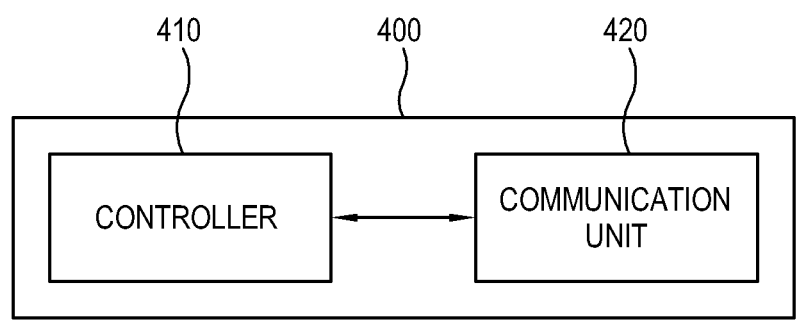
FIG. 7 is a block diagram of an external apparatus in the display system in FIG. 1.

FIG. 7 is a block diagram of an external apparatus 400 in the display system in FIG. 1. Referring to FIG. 7, the external apparatus 400 includes a controller 410 and a communication unit 420 (e.g., communicator). The communication unit 420 communicates with the display apparatus 100 and the plurality of servers 200 and 300 providing the video content to the display apparatus 100. Examples of the communication unit 110 include a network card, a wireless transceiver, a data port, etc. The controller 410 transmits interaction history information of the display apparatus regarding a first server 200 to a second server 300 to enable the second server 300 to provide the video content to the display apparatus 100 based on the interaction history information when the display apparatus 100 interacts with the second server 300. The external apparatus 400 receives the interaction history information regarding the first server 200 from the display apparatus 100. However, according to another exemplary embodiment, the external apparatus 400 may receive the interaction history information from the first server 200.

As described above, the display apparatus 100 according to the present exemplary embodiment transmits the interaction history information of the first server 200 of the plurality of servers providing video contents, to the external apparatus 400 and controls the external apparatus 400 to transmit the interaction history information to the second server 300 so that the second server 300 can provide the video content based on the interaction history information if the display apparatus 100 performs interaction with the second server 300 in the future.

If the interaction history information of the display apparatus 100 regarding the first server 200 is transmitted to the external apparatus 400 as a result of the interaction of the display apparatus 100 with the first server 200, the external apparatus 400 according to the present exemplary embodiment transmits the interaction history information to the second server 300 so that the second server 300 can provide the display apparatus 100 with a video content based on the interaction history information if the display apparatus 200 performs interaction with the second server 300 in the future.

The display apparatus 100 and the external apparatus 400 may be integrated as a single apparatus, or may be provided as separate apparatuses connected locally or through a network.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units and elements of the above-described apparatuses 100, 200, 300, and 400 can include circuitry, a processor, a microprocessor, etc., and may execute a computer program stored in a computer-readable medium.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. An image processing apparatus comprising:
   an image processor which processes video content to display;
   a communicator which communicates with a plurality of servers and an external apparatus; and
   a controller configured to:
   control the communicator to receive a first video content from a first server among the plurality of servers, transmit ID information of the image processing apparatus and history information regarding the first video content to the external apparatus, and receive a second video content based on the history information from a second server among the plurality of servers
   in response to ID information of the image processing apparatus communicating with the second server matching ID information transmitted to the second server from the external apparatus.

2. The image processing apparatus according to claim 1, wherein the controller is configured to control the external apparatus to transmit the history information to the second server to enable the second server to provide the second video content based on the history information when an interaction with the second server is performed.

3. The image processing apparatus according to claim 1, wherein the controller is configured to transmit the history information to the external apparatus in real-time or at a time when a connection to the first server is completed if an interaction with the first server is performed.

4. The image processing apparatus according to claim 1, wherein the history information regarding the first video content comprises at least one of purchase information, viewing and downloading information regarding the first video content, and user feedback information regarding the first video content.

5. The image processing apparatus according to claim 1, wherein the communicator is connected to the external apparatus locally or through a network for communication.

6. The image processing apparatus according to claim 1, wherein the image processing apparatus is formed integrally in the external apparatus.

7. The image processing apparatus according to claim 1, further comprising a display which displays the processed video content.

8. A control method of an image processing apparatus, the control method comprising:
   receiving a first video content from a first server among a plurality of servers;
   transmitting, to an external apparatus, ID information of the image processing apparatus and history information regarding the first video content; and
   receiving, from a second server among the plurality of servers, a second video content based on the history information in response to the ID information of the image processing apparatus communicating with the second server matching ID information transmitted to the second server from the external apparatus.

9. The control method according to claim 8, wherein the transmitting, to the external apparatus, the ID information and the history information comprises transmitting the history information in real-time or at a time when a connection to the first server is completed if interacting with the first server is performed.

10. The control method according to claim 8, wherein the history information regarding the first video content comprises at least one of purchase information, viewing and downloading information regarding the first video content, and user feedback information regarding the first video content.

11. An external apparatus comprising:
    a communicator which communicates with an image processing apparatus, and a plurality of servers interacting with the image processing apparatus to provide video content to the image processing apparatus;
    a controller which receives history information of the image processing apparatus regarding the video content and ID information of the image processing apparatus, transmits the received history information with ID information to a second server of the plurality of servers, in order to enable the second server to provide the video content based on the history information to the image processing apparatus in response to the ID information of the image processing apparatus communicating with the second server matching the ID information transmitted from the external apparatus.

12. The external apparatus according to claim 11, wherein the controller receives the history information in real-time or at a time when a connection of the image processing apparatus to a first server is completed, as a result of an interaction of the image processing apparatus with the first server.

13. The external apparatus according to claim 11, wherein the history information comprises at least one of purchase information, viewing and downloading information regarding the video content, or user feedback information regarding the video content.

14. The external apparatus according to claim 11, wherein the communicator is connected to the image processing apparatus locally or through a network for communication.

15. The external apparatus according to claim 11, wherein the external apparatus is formed integrally in the image processing apparatus.

16. A control method of an external apparatus, the control method comprising:
    connecting to an image processing apparatus and a plurality of servers providing the image processing apparatus with video content;
    receiving, from the image processing apparatus, history information of the image processing apparatus regarding video content and ID information of the image processing apparatus; and
    transmitting, to a second server of the plurality of servers, the received history information with ID information in order to enable the second server to provide the video content based on the history information to the image processing apparatus in response to the ID information of the image processing apparatus communicating with the second server matching the ID information transmitted from the external apparatus.

17. The control method according to claim 16, wherein the receiving the history information comprises receiving the history information in real-time or at a time when a connection of the image processing apparatus to a first server is completed, as a result of an interaction by the image processing apparatus with the first server.

18. The control method according to claim 16, wherein the history information regarding video content comprises at least one of purchase information, viewing and downloading information regarding the video content, and user feedback information regarding the video content.

19. The control method according to claim 16, wherein the transmitting the received history information comprises:
   determining which of the plurality of servers corresponds to the history information; and
   transmitting the received history information to the second server and not transmitting the received history information to a first server according to the determining.

20. The control method according to claim 16, wherein the first server is a first content providing server corresponding to a first account of a user of the image processing apparatus, and the second server is a second content providing server corresponding to a second account of the user of the image processing apparatus.

* * * * *